United States Patent [19]
Riester

[11] 4,014,668
[45] Mar. 29, 1977

[54] WASTE DISPOSAL STRUCTURE AND SYSTEM

[76] Inventor: C. George Riester, 10397 S. Lake Blvd., Parma, Ohio 44130

[22] Filed: June 5, 1972

[21] Appl. No.: 259,835

[52] U.S. Cl. .................. 55/90; 52/245; 55/94; 55/223; 55/228; 110/8 A
[51] Int. Cl.² .......................... B01D 47/12
[58] Field of Search ............ 55/84, 85, 89, 90, 93, 55/94, 223, 228; 110/8 R, 8 A, 10, 119; 52/80, 82, 245

[56] References Cited

UNITED STATES PATENTS

| | | | |
|---|---|---|---|
| 2,997,132 | 8/1961 | Allander et al. | 55/9 B |
| 3,447,287 | 6/1969 | Andersen | 55/85 |
| 3,477,203 | 11/1969 | Luge et al. | 55/9 |
| 3,492,789 | 2/1970 | Jueng | 55/94 |
| 3,668,833 | 6/1972 | Cahill | 55/94 |
| 3,670,669 | 6/1972 | Hoad | 110/8 A |
| 3,704,570 | 12/1972 | Gardenier | 55/84 |

Primary Examiner—Frank A. Spear, Jr
Assistant Examiner—Robert H. Spitzer
Attorney, Agent, or Firm—Donnelly, Maky, Renner & Otto

[57] ABSTRACT

A single building contains trash processing, trash burning, gas treating, and solids treating systems for substantially pollution free disposal of combustible trash material. The building contributes functionally to the gas treating system while presenting an aesthetically pleasing appearance. A novel aspirator for mixing two fluids and a novel filter arrangement also form part of the gas treating system in such manner that need for incorporation of the conventional smoke stack is not required.

22 Claims, 8 Drawing Figures

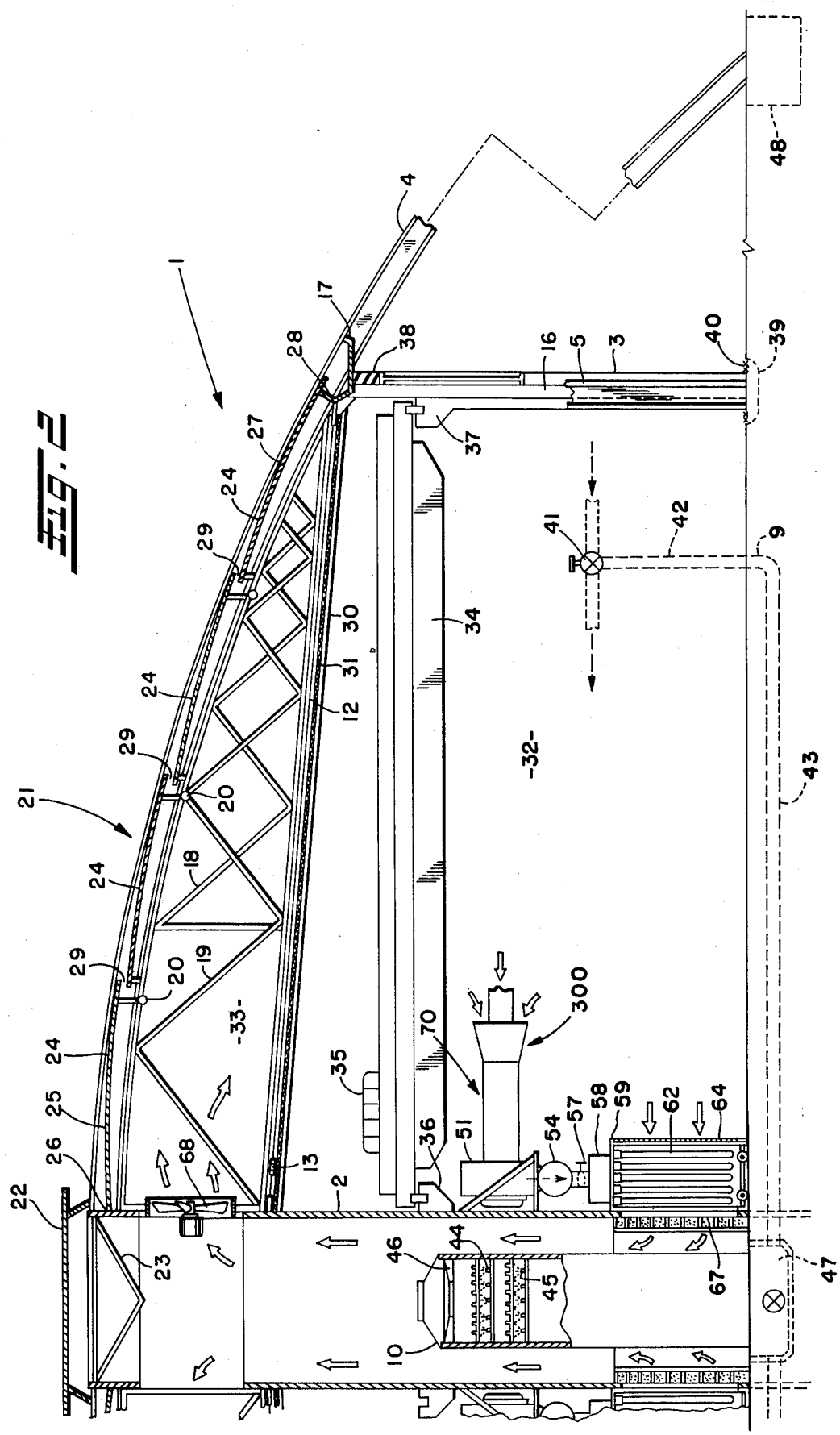

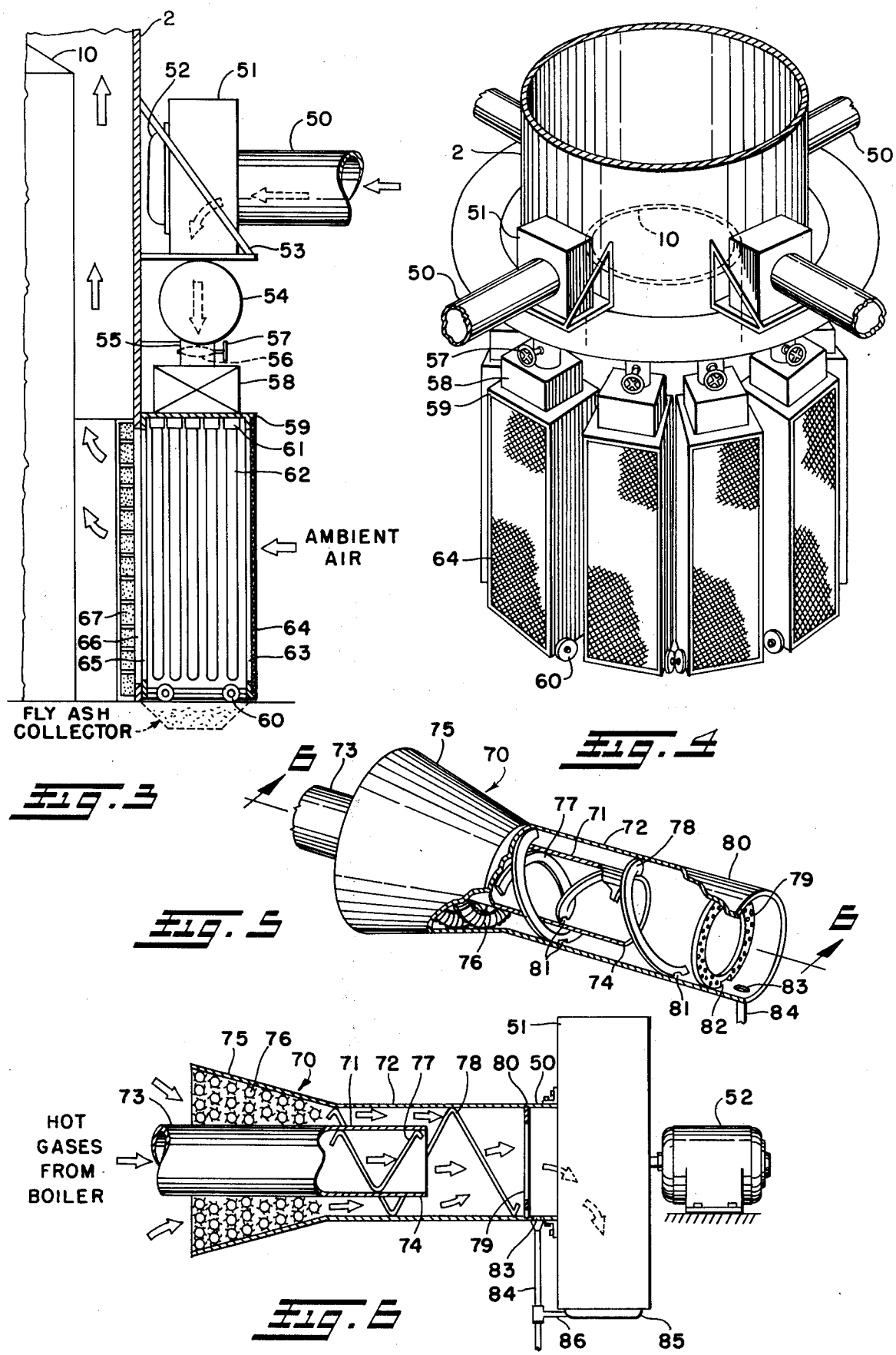

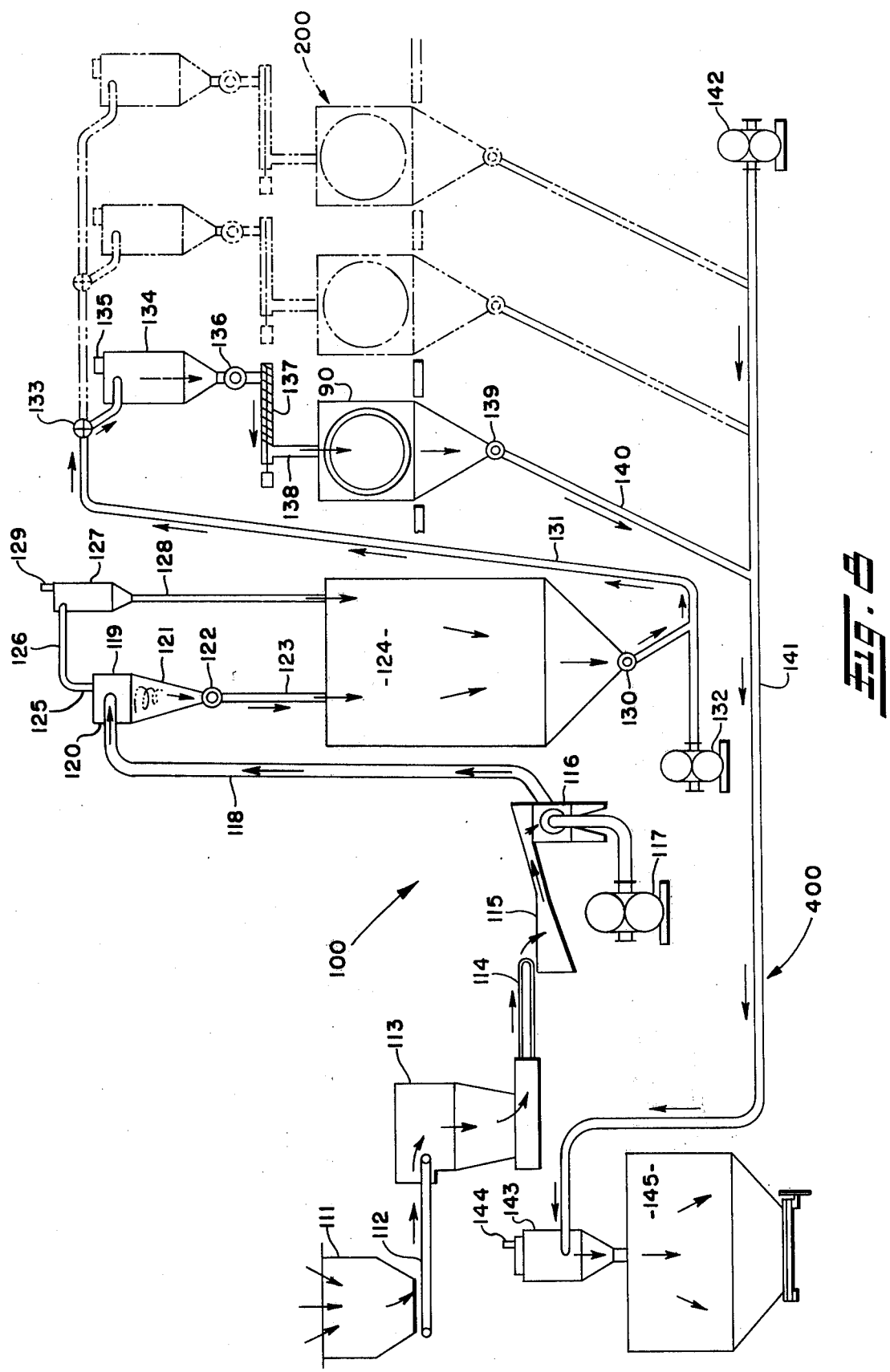

WASTE DISPOSAL STRUCTURE AND SYSTEM

This invention related to an apparatus and method for burning combustible trash materials, capturing energy released in burning combustible trash materials, and processing by-products from the combustible trash materials to avoid polluting the natural environment.

With the increase in concern for ecology and the natural environment, the problem of disposing of combustible trash materials is a growing one. Unprocessed wastes have been a long existing source of environmental pollution; and processed wastes have recently become a dominating source of air, water, and land pollution.

Although incinerators for burning combustible trash materials are well known, such incinerators are unsightly and only effective in reducing the volume of combustible trash materials while producing noxious air polluting gases. A solution to the undesirable production of noxious gases has been to dump wastes in rivers, lakes, and oceans or to bury the wastes in the ground. Consequently, trash has been a source not only of air pollution but also of water and land pollution.

It is, therefore, desirable to develop an appartus and method for reducing the volume of combustible trash materials while avoiding environmental pollution. It is also desirable to recover the energy stored in combustible trash materials to avoid wasting energy.

It is accordingly a primary object of the invention to provide an apparatus and method for processing trash materials while conserving as much as possible natural resources.

A further object of the invention is to conserve natural resources by controlling the burning of combustible trash materials, capturing the energy released by the burning, and processing the by-products from the combustible trash materials.

Another object of the invention is to provide an integrated system for processing combustible trash materials without polluting the environment.

An additional object of the invention is to provide an apparatus and method for processing combustible trash material without air-borne health hazard within the complex.

An additional object of the invention is to provide an apparatus and method for processing combustible trash materials and recovering energy from the trash materials while avoiding pollution of the environment.

A further object of the invention is to provide an aesthetically pleasing building in which combustible trash materials may be processed and which forms part of the processing apparatus.

Another object of the invention is to provide a novel aspirator for mixing two fluids.

A still further object of the invention is to provide a novel aspirator for mixing with ambient air the hot gases emanating from burning combustible material.

A further object of the invention is to provide a novel filter system for filtering gases and mixing the filtered gases with ambient air.

A further object of the invention is to provide a novel method and means to lower existing gas temperatures to near ambient temperature.

These and other objects are realized in the instant invention which comprises an apparatus and method for processing combustible trash materials while avoiding pollution of the environment and for recovering energy released in burning the combustible trash material. The invention includes (a) a trash processing system for processing the trash particles for burning, (b) a trash burning system for burning the processed trash, and (c) a pollution eliminating by-product recovery unit which includes (1) a gas treating system for filtering ash particles and recovering heat energy from the gas emitted by the burned trash and for cooling the gas, and (2) a solids treating system for removing solid waste such as ash from the other systems. The combustible trash materials are processed for burning and then burned in an incinerator, and the released energy in the form of hot gases is converted into steam. The solid by-products in the hot gases are filtered and collected as sterile ash, and the gas by-products are cooled, washed, and vented into the atmosphere through a novel means and without a smoke stack.

To the accomplishment of the foregoing and related ends, the invention, then, comprises the features hereinafter fully described, the following description and the annexed drawings setting forth in detail a certain illustrative embodiment of the invention, this being indicative, however, of but one of the various ways in which the principal of the invention may be employed.

In the annexed drawings:

FIG. 2 is a side elevation view of the invention taken substantially along the lines 2—2 of FIG. 1;

FIG. 3 is an enlarged sectional view of the filter system;

FIG. 4 is an isometric view of the filter system shown in FIG. 3;

FIG. 5 is an isometric view, partially broken away, of an aspirator system of the invention;

FIG. 6 is a sectional view, partially broken away, of the aspirator shown in FIG. 5 taken substantially along the lines 6—6;

FIG. 8 is a schematic diagram of the trash processing, trash burning, and solids treating systems of the invention.

Figure 1:
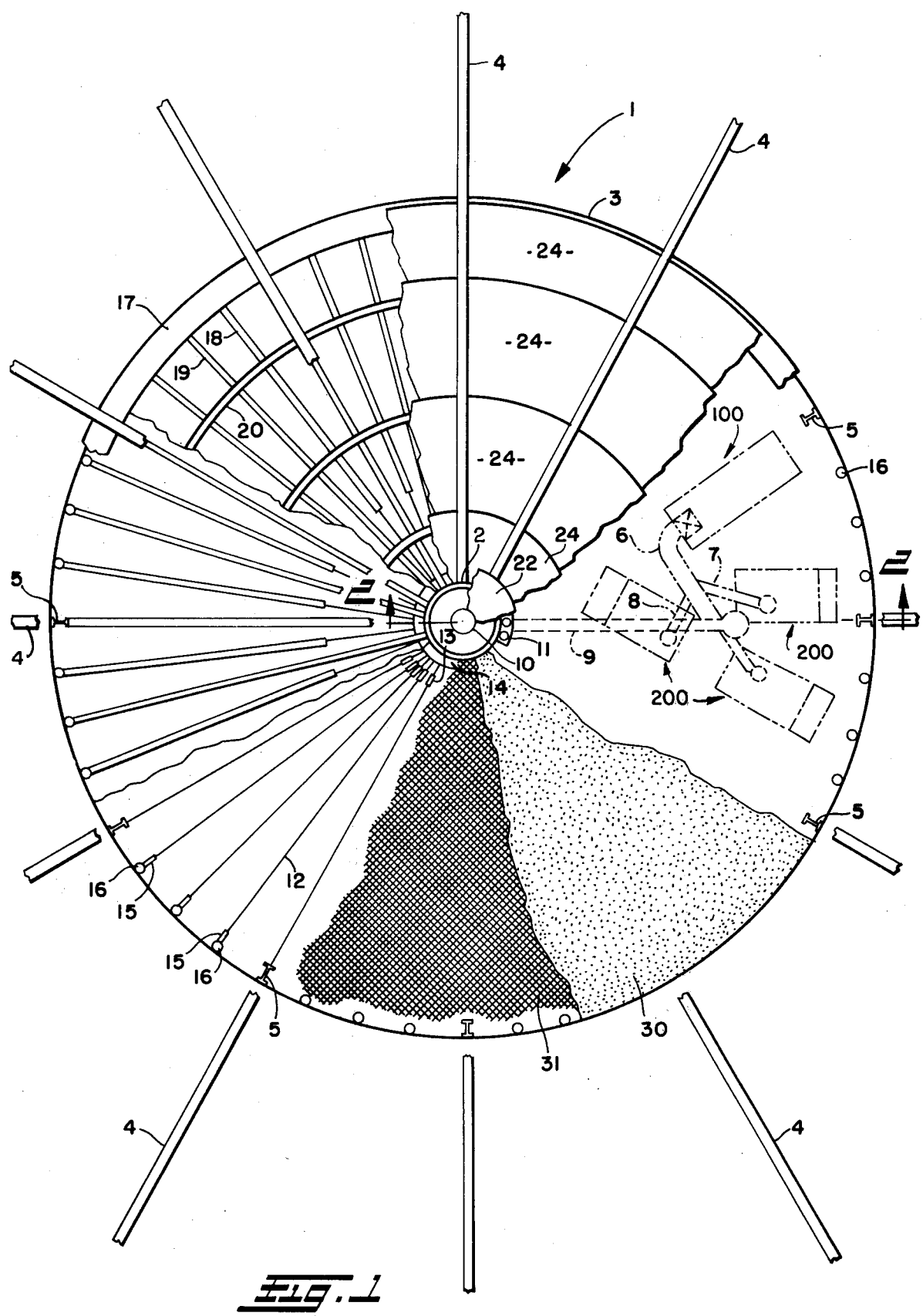
FIG. 1 is a plan view primarily of the housing of the invention.

Referring now to the drawings for a detailed description thereof, wherein like reference numerals are used to indicate like parts in the several figures. The invention comprises four distinct systems: A trash processing system; a trash burning system; a gas treating system; and a solids treating system. The gas treating system and the solids treating system together comprise a pollution eliminating by-product recovery unit. Each of the respective systems is positioned in a building 1. The building of a unique design to contribute functionally as part of the invention while presenting an aesthetically pleasing appearance. The building includes a generally hollow main support member 2, an outer wall generally indicated at 3, and a plurality of curved beams 4 fixed, for example, in a concrete base 48, and which may serve as compression members with main support member 2 being the compression point. A plurality of support beams 5 are positioned at intervals about the perimeter of the building to give added strength thereto. The location of trash processing system 100 and trash burning systems 200 is shown in dotted outline in FIG. 1. Ducts 6, 7 and 8 connect the trash processing system 100 with the trash burning systems 200. A partially underground conduit 9 shown in dotted outline provides an emergency flow connection between trash burning systems 200 and dump stack 10 serving as an emergency gas treatment system.

The main support member 2 provides a housing for dump stack 10, a pipe chase for pipes 11, and a gas flow path as will be described hereinafter. Cables 12 connected at one end through turn buckles 13 to gusset 14 surrounding main support member 2 and at the other end by gussets 15 to part of the outer wall 3 provides an inward tension on the outer wall and the curved beams 4. Cables 12 may be connected to the outer wall 3 at support beam 5, drain pipe 16, or at gutter 17 surrounding the building. Gutter 17 serves as a compression ring surrounding the building. Short trusses 18 and long trusses 19 provide additional strength for the building 1, and are connected to each other by spray pipes 20 which serve as purlins for the structure and which may be connected to a source of pressurized liquid, not shown.

The roof of building 1 is shown generally at 21 in FIG. 2. A cap member 22 is positioned directly above the main support member 2 and has deflectors 23 for deflecting gas flow. The roof 21 slopes downward generally parallel to curved beams 4 from cap member 22 to outer wall 3. The roof is comprised of a plurality of downward sloping overlapping tiles 24 supported by short and long trusses 18 and 19 as well as by spray pipes 20. The highest roof tile 25 is supported by main support member 2 at point 26, and at lowest roof tile 27 is supported by an extension 28 of gutter 17. Each pair of overlapping roof tiles 24 forms a gap 29 therebetween, and spray pipes 20 are positioned to direct a spray of liquid, such as water, into each gap whereby the water spray will be deflected by the higher roof tile onto the lower roof tile of each pair of overlapping roof tiles.

The building 1 is divided by a water tight, water proof fabric membrane 30 supported by a wire grid 31 connected to cables 12 into a lower chamber 32 and an upper chamber or plenum 33. Crane 34 including movable hoist member 35 is supported at one end by support 36 connected to main support member 2 and at the other end by crane-way 37 at the outer wall 3. Also positioned in the lower chamber 32 are the trash processing 100 and trash burning systems, shown in dotted outline in FIG. 1, and a portion of the gas treating 300 and solids treating 400 systems. These systems will be described in more detail with reference to FIGS. 3 through 8.

Outer wall 3, as shown in FIG. 2 includes support beam 5, drain pipes 16 and louvers 38. Drain pipes 16 conduct water or other liquid from gutter 17 to drain 39 covered by grating 40. Liquid collected in drain 39 may be recirculated or connected to a sewer outlet.

Rotary valve 41 and emergency conduit 9, having an above ground portion 42 and an underground portion 43, connect dump stack 10 to the trash burning or gas treating systems. Dump stack 10 is a two-stage wet-wash impingement device including spray pipes 44 and 45 and fan 46. Collecting drain 47 is positioned beneath the dump stack 10 to collect liquids and solids from the dump stack 10 and emergency conduits 42 and 43. Emergency conduit 43 may be located underground below the building 1 and may be comprised of sewer tiles which are not as susceptible to wear as metalic pipes.

In a preferred embodiment of the invention the building 1 is of a generally cylindrical configuration, and the hollow main support member 2 is also generally cylindrical. Several gaps 29 between overlapping roof tiles 24 at several levels will form substantially annular openings continuous around the roof, and crane 34 is rotatable 360° around the building on support 36 and craneway 37. The elements of the various systems are positioned within the building, and no smoke stacks are used thereby presenting a clean and aesthetically pleasing appearance in the surroundings. Also, the roof of the building may be designed aerodynamically, i.e., curved as an airplane wing, to eliminate "sail effect" and to provide positive venting of plenum 33.

A portion of the gas treating system is shown in FIGS. 3 and 4. Referring more specifically to FIG. 3, inlet conduit 50 is coupled to blower 51 powered by a turbine 52 through which hot gases from the other portions of the gas treating system and the trash burning system flow. The blower 51 is positioned on bracket 53 which is supported by main support member 2. A 360° duct 54 couples the blower 51 to conduit 55 including an adjustable damper 56 and handle 57. The duct 55 is connected to rectangular duct 58 which is connectible to filter or bag house 59.

The bag house 59 is positioned on rollers 60 and is easily detachable from rectangular duct 58 to facilitate removal of the bag house from the gas treating system for cleaning or other service. The bag house includes a plurality of apertures 61 which conduct gas to commercially available filtering bags 62 wherein particles contained within the gases are retained. An opening 63 in the bag house 59 is covered by grating 64 to permit ambient air from the building to enter the bag house. An opening 65 on the other side of the bag house provides an entrance way for ambient air and hot gases to flow into main support member 2 through opening 66 therein. A final filter 67, which may be framed by main support member 2, filters out any further particles from the hot gases and provides a flow impedance to the gases ambient air to facilitate mixing of the two. Fan 68, shown in FIG. 2, draws the hot gases and ambient air from the bag house 59 through the final filter 67 up through main support member 2, and into the plenum 33 as shown by the arrows in the drawings.

In FIG. 4, four inlet conduits 50 are shown entering four respective blowers 51, and each inlet conduit and blower has associated therewith three respective bag houses 59. Each bag house is coupled to its respective inlet conduit and blower through individual rectangular ducts 58, adjustable dampers 56, etc. The outline of the dump stack 10 positioned within main support member 2 is also shown in FIGS. 3 and 4. Although the bag houses are shown as individual elements in FIG. 4 one single continuous bag house unit surrounding main support member 2 may be substituted for the individual units, if desired.

Referring now to FIGS. 5 and 6, an aspirator for mixing two fluids is shown generally at 70. The aspirator comprises an inner conduit 71 and a generally concentric outer conduit 72. The inlet end 73 of the inner conduit may be coupled to the hot gases flowing in the gas treating system, and the outlet end 74 permits the hot gases to flow into outer conduit 72. The inlet end 75 of the outer conduit is formed of an enlarged conical section to facilitate the flow of ambient air into the outer conduit 72. A plurality of fin cooling coils 76, which may be filled with cold water or other suitable liquid, are positioned in the inlet end 75 of outer conduit 72 to cool ambient air entering the outer conduit.

A helical flow deflector 77 is positioned in inner condit 71, and a helical flow deflector 78 is positioned in outer conduit 72. A wiper made of COR-TEN steel or other condensation inducing material is positioned near the exit end 80 of outer conduit 72. The exit end 80 is also the exit of the aspirator 70, which may be coupled to or consist of inlet conduit 50 referred to above.

The positioning of fin cooling coils 76 in the flow path of the ambient air reduces the amount of condensation from hot gases flowing in inner conduit 71. Liquids which condense from the hot gases may include caustic or acidic materials which may produce unnecessary wear on the system. In order to facilitate the flow of condensed liquids from the aspirator 70, openings 81 are located in helical deflectors 77 and 78 at the bottoms of the inner conduit 71 and outer conduit 72, and opening 82 is located in wiper 79 at the bottom of outer conduit 72. Liquid condensate in the aspirator 70 will flow to drain opening 83 connected to drain pipe 84 which will conduct the liquid from the aspirator 70. A drip pan 85 located in the bottom of blower 51 is connected by pipe 86 to the drain pipe 84 to eliminate liquid condensate from the blower itself.

Figure 7:
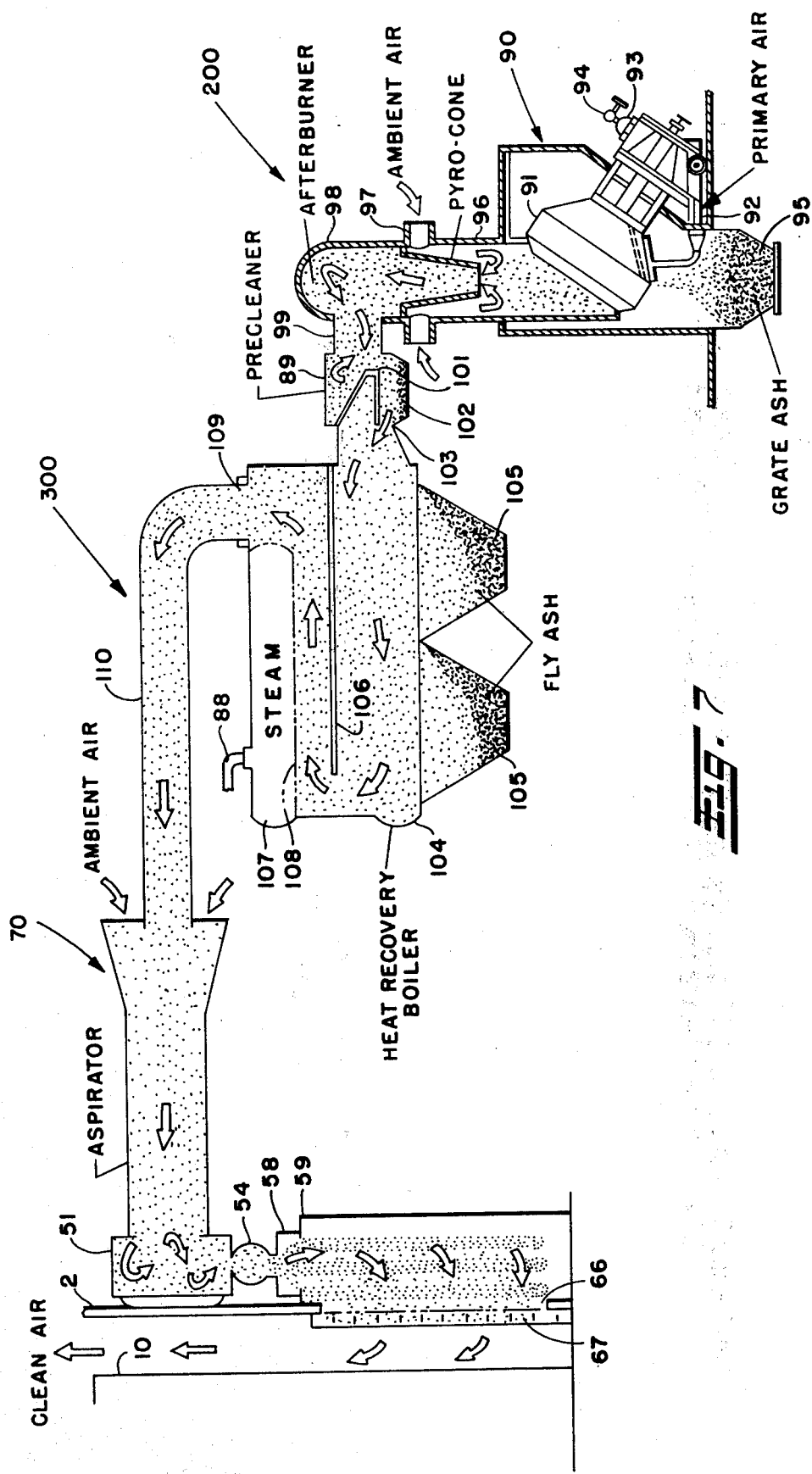
FIG. 7 is a schematic system diagram of the trash burning and gas treating systems including the energy recovery system of the invention.

Trash burning system 200 and a further portion of a gas treating system 300 are shown in FIG. 7. The trash burning system includes an incinerator generally indicated at 90 having a tumbling barrel 91, a source of air 92, and a gas source 93. Regulator valve 94 allows the gas source 93 to be turned off when the burning temperature within the incinerator is adequate to maintain combustion without the addition of gas. The solid waste from the burned trash material falls to the bottom 95 of the incinerator 90 and is collected there as sterile grate ash. The upper part 96 of incinerator 90 includes inlets 97 for ambient air and an after burner 98 for completing the combustion process. The incinerator itself may be a commercially available incinerator such as an incinerator known by the name "Pyrocone" made by Aqua-Chem Division of Coca-Cola Company.

The ouput from trash burning system 200 is coupled by a conduit 99 to the first portion of the gas treating system 300 which is pre-cleaner 89. Pre-cleaner 89 includes a deflecting wall 101 and collecting chamber 102. The outlet 103 of pre-cleaner 89 is connected to heat recovery boiler 104 which includes collecting chambers 105 and deflector wall 106. A fluid chamber 107 containers a fluid, such as water, whose temperature is to be raised by the heat of the gases flowing in heat recovery boiler 104 passing through thermally conductive wall 108. Hot gas outlet 109 from heat recovery boiler 104 is coupled by conduit 110 to aspirator 70 which was described above with reference to FIGS. 5 and 6, and conduit 88 removes the heated liquid from chamber 107. Blower 51, 360° duct 54, rectangular duct 58, bag house 59, and main support member 2 have all been described above.

Trash processing system 100, trash burning system 200, and solids treatig system 400 are shown on FIG. 8. Trash receiving pit 111 may be located outside the building 1. The conveyor 112 feeds trash materials from receiving pit 111 to shredder 113 which is coupled by conveyor 114 to surge bin 115. Pneumatic feeder 116 powdered by blower 117 feeds the trash material from surge bin 115 through conduit 118 to cyclone separtor 119. The trash receiving pit 111, conveyor 112, shredder 113, conveyor 114, and surge bin 115 are under negative pressure supplied by blower 117.

The cyclone separator 119 consists of an upper cylindrical portion 120 into which the trash material is fed tangentially and a lower tapering conical section 121. Valve 122 couples cyclone separator 119 through conduit 123 to storage bin 124. The dust outlet 125 from cyclone separator 119 is connected by take off conduit 126 to dust collector 127 which may also be a cyclone separator. The main outlet from dust collector 127 is coupled to storage bin 124 by conduit 128, and outlet 129 may be connected to a waste bin not shown.

Storage bin 124 is connected through rotary air lock 130 to pneumatic feeder conduit 131 powered by blower 132. Pneumatic feeder conduit 131 is connected to a plurality of receiver separator, conveyor, and incinerator systems, only one sysem of which will be discussed hereinafter. Diverter gate 133 connects pneumatic feeder conduit 131 to receiver separator 134 which may be a cyclone separator. The dust outlet 135 of receiver separator 134 may be connected to a waste bin, not shown, as mentioned above with respect to dust collector 127. The main outlet for receiver separator 134 is connected by rotary valve 136 to a screw conveyor 137 which feeds trash material to conduit 138 coupled to incinerator 90.

Incinerator 90 is coupled to rotary air lock 139 to conduit 140 which feeds to a pneumatic feeder conduit 141 powered by blower 142. The pneumatic feeder conduit 141 conducts the sterile grate ash from incinerator 90 to receiver separator 143 which also may be a cyclone separator. The receiver separator 143 has an outlet 144 which may be connected to the above mentioned bin not shown and is connected to bin 145 wherein the sterile grate ash may be collected and stored.

In summary, the trash processing system 100 encompasses the apparatus for reducing individual trash particles to a size which is easily burnable in the trash burning system 200. The trash burning system includes the apparatus for burning and after burning the trash material received from the trash processing system 100. The gas treating system includes all apparatus for treating the gases from the trash burning system including filtering solid material from the gases, recovering heat energy, cooling the gases, washing the gases, and venting the gases to the atmosphere. The solids treating system 400 includes all apparatus for removing grate ash and fly ash from the trash burning and gas treating systems. The fly ash collector chamber beneath the bag house may also be connected to bin 145 by means of appropriate conduit. In this regard the collecting chambers 102 and 105 may also be connected to bin 145 for storage or alternatively to the above mentioned waste bin, not shown.

Operation of the invention will now be described. Combustible trash material may be dumped from a dump truck, for example, into trash receiving pit 111 which is under negative pressure and normally closed. The trash material is fed by conveyor 112 to shredder 113 which reduces the size of individual particles of the trash material. Conveyor 114 feeds the shredded trash material to surge bin 113. The surge bin is connected to cyclone separator 119 by conduit 118. Blower 117 provides a source of pressurized air to pneumatic feeder 116 to blow the trash material through conduit 118 to cyclone separator 119. Surge bin 115 provides a temporary storage area for trash material in the event of a backlog of material to be fed through pneumatic feeder 116.

The cyclone separator 119 separates dust at outlet 125 from heavier trash material which falls through lower portion 121 of cyclone separator 119. The operation of cyclone separators is well known and will not be further discussed herein. The heavy trash material from cyclone separator 119 will pass through valve 122 through conduit 123 and into storage bin 124 for storage until burning. The outlet 125 from cyclone separator 119 feeds the dust material through conduit 126 to a dust collector 127. The heavier particles of dust may drop through conduit 128 into storage bin 124, and the lighter dust particles may be removed at outlet 129 to a waste bin, not shown.

A rotary air lock 130 permits trash material from storage bin 124 to flow into pneumatic feeder conduit 131 which is powered by blower 132. The rotary air lock 130 prevents the back flow of air from pneumatic feeder conduit 131 into storage bin 124.

Diverter gate 133 may be adjusted to allow the proper amount of trash material to flow to receiver separator 134 or to any one of the other receiver separators shown in FIG. 8. The outlet 135 from receiver separator 134 may conduct dust material from the receiver separator to the waste bin mentioned above.

Heavy trash material falling through receiver separator 134 will pass through valve 136 along screw conveyor 137, which is a well known device for moving solid materials, to conduit 138. The trash material is then burned in incinerator 90, and the sterile grate ash passes through rotary air lock 139 through conduit 140 to pneumatic feeder conduit 141. Blower 142 provides a source of pressurized air to blow the sterile grate ash to receiver separator 143. Rotary air lock 139 prevents the back flow of air from blower 142 through conduit 140 into incinerator 90.

Dust particles from the sterile grate ash are separated in receiver separator 143 and removed at outlet 144 to an appropriate area such as the above mentioned waste bin. The heavier sterile grate ash falls from receiver separator 143 to bin 145 for collection and storage. This sterile grate ash may be sold as a useful by product for use, for example, in the manufacture of concrete.

In the trash burning system, shown in FIG. 7, the combustible trash material is fed to incinerator 90. Tumbling barrel 91 mixes the trash to allow for complete burning of the trash materials. To initiate burning, the gas source 93 is turned on to provide a source of combustible gas to mix with oxygen from air source 92 in the tumbling barrel, and a fire is put to this gas and oxygen mixture. When the temperature within the tumbling barrel is sufficient to maintain combustion of the combustible trash without a need for the gas, the regulator valve 94 may be adjusted to close the gas source from the system.

Sterile grate ash resulting from the burned combustible trash material collects at the bottom 95 of the incinerator. Hot gases from the burning combustible trash material mix with ambient air from openings 97 and flow to afterburner 98 for final burning.

Solid particles contained in the hot gases exiting from afterburner 98 are settled out in pre-cleaner 89 due to deflecting wall 101 which slows the flow of gases through the pre-cleaner. These particles are collected in collecting chamber 102.

Further small particles contained in the hot gases may settle out in the heat recovery boiler 104 into collecting chambers 105 as fly ash. Wall member 106 further reduces the velocity of gas flow in the heat recovery boiler to allow a maximum amount of fly ash to settle out. Heat energy from the hot gases may be transferred through thermally conducting wall 108 to fluid contained within the fluid chamber 107. The heat energy will then be transferred to the fluid contained within the fluid chamber 107. This fluid may be for example, water, and the temperature to which the water is raised may be sufficient to convert the water to steam. The steam may then be condensed as distilled water, or, alternatively, the steam may be used to do work such as to produce electric power. Outlet conduit 88 may be used to conduct the heated fluid from fluid chamber 107 to an area where it may be utilized.

The hot gases flow from heat recovery boiler through outlet 109 and conduit 110 to aspirator 70. As shown in FIGS. 5 and 6, the hot gases enter aspirator 70 through the inlet end 73 of inner conduit 71 and are caused to rotate by helical deflector 77. As the rotating hot gases exit from inner conduit 71 at exit end 74 into outer conduit 72 a venturi effect is produced thereby drawing ambient air into the outer conduit 72 through inlet end 75. The ambient air is chilled by fin cooling coils 76 and is caused to rotate by helical deflector 78. As shown in FIG. 5 helical deflector 77 causes the hot gases to rotate in a counter-clockwise direction while helical deflector 78 causes the ambient air to rotate in a clockwise direction, thereby increasing the turbulence as the hot gases and ambient air interact thereby increasing the degree of mixing. Alternatively, the helical deflector 77 may be clockwise and helical deflector 78 may be counter-clockwise. Wiper 76 provides a surface on which liquids may condense from the gases. The aspirator 70 may be slanted downward to facilitate the flow of condensed liquids through openings 81 in the helixes and opening 82 in the wiper to drain opening 83. However, the flow of ambient air and hot gases through the aspirator may be sufficient to induce the flow of liquids along the bottom of the inner and outer conduits to drain opening Blower 51 boosts the flow of gases through aspirator 70 to the subsequent bag houses 59. The blower 51, as well as other blowers used in the invention, may be powered by turbines such as turbine 52 to reduce the end for copper used in standard electric motors. Drip pan 85 collects any liquids condensed in blower 51 and such liquids are conducted by pipe 86 to drain pipe 84.

The hot gases, which are now somewhat cooled due to the action of aspirator 70, pass through blower 51 to 360° duct, conduit 55, damper 56, and rectangular duct 58 into bag house 59. The 360° duct provides a storage area for gases flowing thereinto to facilitate the closing of damper 56 by rotation of handle 57. The rectangular duct 58 is easily detachable from the bag house 59 to permit removal of individual bag houses for cleaning or other servicing.

The gases entering bag house 59 pass through apertures 51 into filtering bags 62. The bags are fitted with a self-cleansing device well known to the trade. Relatively light weight commerically available filtering bags 62 having a large air volume per square foot may be used in the bag house because the aspirator 70 has substantially cooled the gases and removed the moisture therefrom. Opening 63 in bag house 59 permits the entrance of ambient air into the bag house. This ambient air mixes with the filtered gases in the bag house and further cools and dilutes the gases. Final filter 67 removes any further small particles from the gases and provides a flow impedance to the gases and ambient air thereby inducing further mixing of the two.

The bag house is on rollers 60 for easy removal from its position adjacent the main support member 2. If desired, the crane 134 may be used to move any of the bag houses 59 or any other equipment in the building. Final filter 67 provides a protective covering over opening 66 in main support member 2 when a bag house 59 is removed from its operational position. Grating 64 on bag house 59 provides a protective covering over opening 63 of the bag house.

As shown in FIG. 4, four individual inlet conduits receiving hot gases from respective trash processing, trash burning, and gas treating systems may be utilized. Each respective inlet conduit 50 has a blower 51 for boosting gas flow from the inlet conduit into respective bag houses. As shown, each inlet conduit and blower feeds to three respective bag house, each bag house having its own 360° duct, adjustable damper and rectangular duct. This particular configuration allows for the closing of one damper 56 for a given inlet conduit 50 to allow removal of one of the bag houses 59 from the system. The other two bag houses associated with the particular inlet duct 50 absorb the function of the removed bag house, thereby eliminating the necessity to shut down an entire operation for cleaning or servicing of a bag house.

In the event of a need to shut down the trash burning system or one of the elements in the gas treating system, rotary valve 41 will divert the gas flow through conduit 42 and underground conduit 43 to dump stack 10. Rotary valve 41 may be connected to the gas treating system at afterburner 98, precleaner 89, heat recovery boiler 104, aspirator 70, or other convenient place. In fact, a plurality of rotary valves may be used with one positioned at each location in the gas treating system and each connected to conduit 42. When rotary valve 41 is in its normal operating position the hot gases may flow along their normal flow path. However, if an emergency situation is created or if the trash burning system is shut down the rotary valve 41 is adjusted to its emergency position thereby directly the hot gas flow to dump stack 10.

The dump stack 10 includes a plurality of spray pipes 44 and 45 for washing and cooling the hot gases flowing therethrough. Fan 46 induces the flow of gases through conduits 42 and 43 and dump stack 10. Waste liquid may be collected in collecting drain 47 and subsequently directed to a sewer outlet. Dump stack 10 is normally not in operation, and is only utilized during a shut down of a portion of the trash burning or gas treating systems. Hot gases exiting final filter 67 or exiting dump stack 10 are drawn up through main support member 2 into plenum 33 by fan 68. Deflector 23 also directs the flow of gases into the plenum.

Spray pipes 20 direct a spray of liquid, such as water or other suitable liquid, into gaps 29. Roof tiles 24 are so positioned as to deflect the liquid spray from the upper roof tile to the roof tile therebelow. The liquid will then flow from roof tile to roof tile crossing each gap in the flow path and is collected in gutter 17. As the liquid flows across a gap a chilling and aeration effect is achieved thereby cooling and purifying the liquid. The roof 21 of building 1 therefore acts as a cooling tower.

Fabric membrane 30 is water repellant and water tight to conduct any liquid dripping from spray pipes 20 or wind blown through gaps 29 into plenum 33 to gutter 17 while protecting chamber 32 from such liquid.

The fabric membrane is generally subject only to the pressure of the gases contained in plenum 33 and the chamber 32. The gases in plenum 33 exit from the housing through gaps 29 between roof tiles 24 passing through the water spray from spray pipes 20, the water deflected by the roof tiles 24, and the water flowing across roof tiles and gaps 29. As the gases vent to the atmosphere through the water the gases are cooled and finally washed.

As can be seen from the above disclosure, the building 1 contributes significantly to the operation of the gas treating, and solids treating systems. The ideal combination of structural members for the building, such as the use of short trusses 18 and long trusses 19 together with spray pipes 20 acting as purlins and roof supports, permits the use of relatively light weight curved beams 4. Also, the cables 12 providing an inward tension through gutter 17 and the other members to which the cables are connected allow for relatively light weight truss design. The positioning of the drain pipes 16 around the perimeter of the building between support beams 5 gives added strength to the building. Louvers 38 in outer wall 3 permit the inflow of ambient air to chamber 32 of the building 1 eliminating the need for stacks or other vent openings, and the lower surface of gutter 17 provides a rain shield for louvers 38 to prevent rain from entering the building therethrough. The roof of the building is of a generally aesthetically pleasing appearance, and the water or other liquid flowing across the roof, makes an interesting view. The roof itself may be designed aerodynamically to facilitate the venting gases through gaps 29 and to eliminate "sail effect" on the roof.

In short, the invention provides a clean, aesthetically pleasing, efficient building, and system constructed to make optimum use of materials, to house the trash processing, trash burning, gas treating, and solids treating systems, while contributing substantially as an element of the gas treating system, and to eliminate the possibilities of air, water or land pollution due to combustible trash materials. There is no need for conventional smoke stacks.

The embodiments of the invention in which an exclusive property or privilege is claimed are defined as follows:

1. A method for disposing of trash within a building of the type including a downwardly sloping roof at least partly supported on a hollow central support and a plenum chamber beneath the roof separated from the main building chamber, comprising the steps of: processing trash within said main building chamber, burning the trash within the main building chamber to produce waste gases, directing said gases through said central support to said plenum chamber, and discharging the gases from said plenum chamber to atmosphere through openings in the roof.

2. The method of claim 1 and further including the step of cascading liquid down the exterior of said roof for contact by the gases discharged through the roof.

3. The method of claim 1 and including the step of filtering said gases for removing particulate material therefrom prior to the step of directing said gases through said central support.

4. The method of claim 1 and including the step of mixing air with said gases prior to said step of directing said gases through said central support.

5. The method of claim 4 and including the step of cooling the air prior to mixture thereof with said gases.

6. A building for enclosing and forming part of a trash disposal system comprising: a hollow central core, a roof extending downwardly and outwardly from said central core, said roof including overlapping sections which overlap in a direction outwardly from said central core and having generally vertical gaps between the overlapped end portions thereof, separating means spaced downwardly from said roof for separating a main building chamber from a plenum chamber beneath said roof, and exhaust passage means for exhausting gases produced in said main building chamber through said central core to said plenum chamber for exhaust to atmosphere through said gaps.

7. The building of claim 6 and including liquid supply means for producing flow of liquid down the exterior of said roof and across said gaps for contact of said liquid by gases exhausted from said plenum chamber through said gaps.

8. The building of claim 7 wherein said liquid supply means comprises spray means positioned in said plenum chamber for spraying liquid toward and through said gaps.

9. The building of claim 8 and including gutter means for receiving liquid flowing down said roof and separating means.

10. The building of claim 6 wherein said roof is generally conical and said gaps comprise a plurality of generally concentric circumferential openings spaced-apart in a direction extending outwardly from said central core.

11. The building of claim 6 wherein said separating means comprises a diaphragm supported on a plurality of generally radially extending circumferentially-spaced cables secured at their inner ends to said central core and sloping downwardly toward their outer ends, and said roof being at least partly supported by said central core.

12. A trash disposal system including trash processing means for processing trash, trash burning means for burning trash fed thereto from said trash processing means, and gas treating means for treating gases from said burning means prior to discharge thereof to atmosphere, said gas treating means including solids separating means for separating solids from said gases, ambient air mixing means between said burning means and solids separating means for mixing ambient air with said gases prior to passage thereof to said solids separating means, and deflector means for deflecting ambient air and gases in generally helical opposite directions prior to mixture thereof with one another to provide highly turbulent mixing action.

13. A trash disposal system including trash processing means for processing trash, trash burning means for burning trash fed thereto from said trash processing means, and gas treating means for treating gases from said burning means prior to discharge thereof to atmosphere, said gas treating means including solids separating means for separating solids from said gases, ambient air mixing means between said burning means and solids separating means for mixing ambient air with said gases prior to passage thereof to said solids separating means, and condensate removal means for removing liquid condensate from said mixing means.

14. A trash disposal system including trash processing means for processing trash, trash burning means for burning trash fed thereto from said trash processing means, and gas treating means for treating gases from said burning means prior to discharge thereof to atmosphere, said gas treating means including solids separating means for separating solids from said gases, ambient air mixing means between said burning means and solids separating means for mixing ambient air with said gases prior to passage thereof to said solids separating means, and a building enclosing said system, said building including a hollow central core and a roof, and connecting means for connecting said mixing means with said central core for passage of the air-gas mixture upwardly through the interior of said hollow central core.

15. The disposal system of claim 14 and including diaphragm means spaced below said roof to define a plenum chamber, and an opening in said central core establishing communication between the interior thereof and said plenum chamber.

16. The disposal system of claim 15 wherein said roof is at least partly supported by said central core and slopes downwardly and outwardly therefrom, and including liquid cascade means for cascading liquid down the exterior of said roof, and openings in said roof for passage of the air-gas mixture through said liquid.

17. The disposal system of claim 16 wherein said roof includes overlapping roof sections having generally vertical gaps between the end portions thereof to define said cascade means and openings, and liquid spray means in said plenum chamber for spraying liquid toward and through said gaps.

18. The disposal system of claim 15 wherein said building includes an outer wall, a plurality of circumferentially-spaced cables extending between said central core and said outer wall for supporting said diaphragm.

19. The disposal system of claim 18 wherein said diaphragm slopes downwardly and outwardly from said central core, and gutter means on the outer periphery of said roof and diaphragm for receiving liquid flowing down said roof and diaphragm.

20. A trash disposal system including trash processing means for processing trash, trash burning means for burning trash fed thereto from said trash processing means, and gas treating means for treating gases from said burning means prior to discharge thereof to atmosphere, said gas treating means including solids separating means for separating solids from said gases, ambient air mixing means between said burning means and solids separating means for mixing ambient air with said gases prior to passage thereof to said solids separating means, said mixing means comprising: first flow means having an inlet end and an exit end through which said gases may flow in a given flow direction; second flow means substantially concentric with said first flow means having an inlet end and an exit end through which said ambient air may flow in said flow direction; first deflector means positioned in said first flow means for deflecting said gases flowing therein; second deflector means positioned in said second flow means for deflecting said ambient air flowing therein; cooling means positioned in said second flow means near said inlet end for cooling ambient air flow...g therein; whereby said gases flowing through said first flow means and exiting into said second flow means will draw said ambient air passed said cooling means into said second flow means, and said first and second deflector means will induce thorough mixing of said gases with said ambient air.

21. The disposal system of claim 20 and including cooling means in said inlet end of said second flow means for cooling fluid flowing therethrough.

22. A trash disposal system including trash processing means for processing trash, trash burning means for burning trash fed thereto from said trash processing means, and gas treating means for treating gases from said burning means prior to discharge thereof to atmosphere, said gas treating means including solids separating means for separating solids from said gases, ambient air mixing means between said burning means and solids separating means for mixing ambient air with said gases prior to passage thereof to said solids separating means, said solids separating means including filtering apparatus comprising: a housing; a first opening in said housing through which said gases may enter said housing; filter means in said housing coupled to receive said gases flowing through said first opening, whereby solid particles contained in said gases will be retained in said filter means while said gases pass through said filter means; a second opening in said housing through which ambient air may enter said housing exterior of said filter means for mixing with said gases; a third opening in said housing through which said gases and ambient air may be drawn; and means for restricting flow of said gases and said ambient air through said third opening to induce mixing of said gases and said ambient air; whereby gases entering said housing through said first opening exit said housing through said third opening substantially particle free and mixed with ambient air.

* * * * *